United States Patent [19]

Lipman

[11] Patent Number: 5,075,606
[45] Date of Patent: Dec. 24, 1991

[54] SOLID STATE DC FAN MOTOR

[76] Inventor: Leonard H. Lipman, 1410 Magnolia, Kingwood, Tex. 77339

[21] Appl. No.: 567,148

[22] Filed: Aug. 14, 1990

Related U.S. Application Data

[63] Continuation-in-part of Ser. No. 303,320, Jan. 27, 1989, Pat. No. 4,949,022.

[51] Int. Cl.⁵ .......................... H02K 9/04; F04B 35/04
[52] U.S. Cl. ..................................... 318/254; 310/63; 417/423.7
[58] Field of Search .................. 318/138, 254; 310/63, 310/49 R, 49 A, 62; 417/355, 356, 423.1, 423.7; 416/189 A, 189 B, 189 R, 190, 192

[56]    References Cited
        U.S. PATENT DOCUMENTS

| | | | |
|---|---|---|---|
| 2,536,130 | 1/1951 | Herrman | 416/189 R |
| 3,680,977 | 8/1972 | Rabouyt et al. | 416/192 X |
| 3,988,652 | 10/1976 | Endo et al. | 318/254 X |
| 4,123,666 | 10/1978 | Miller | 417/356 X |
| 4,164,690 | 8/1979 | Müller et al. | 318/254 |
| 4,459,087 | 7/1984 | Barge | 318/254 X |
| 4,505,041 | 3/1985 | Tsuchikawa et al. | 416/192 X |
| 4,553,075 | 11/1985 | Brown et al. | 318/138 X |
| 4,618,806 | 10/1986 | Grouse | 318/138 X |
| 4,924,156 | 5/1990 | Müller | 318/254 |

Primary Examiner—Bentsu Ro
Attorney, Agent, or Firm—James L. Jackson

[57]    ABSTRACT

A direct current electric fan motor according to the present invention employs a circular fan housing forming the circular fan rotor opening and a circular fan rotor recess. Curved elongate electrical coils having curved ferrous metal cores therein are received within spaced receptacles in the housing and are connected in series by conductors which are received within grooves formed by the housing. A retainer element provided with a circular locator projection is received in assembly with the housing to encapsulate the coils and conductors within the housing. A fan rotor supported within the housing has an external rim that is received within the circular recess of the housing and supports a plurality of permanent magnets which are each positioned with the same polarity thereof being exposed to the coils. Solid state motor circuitry is provided which includes a Hall sensor for commutation and a temperature controlled speed control circuit. Fan mounting apparatus is provided for friction retention of the fan with respect to a bulkhead or other structure of electrical equipment.

14 Claims, 6 Drawing Sheets

FIG.1
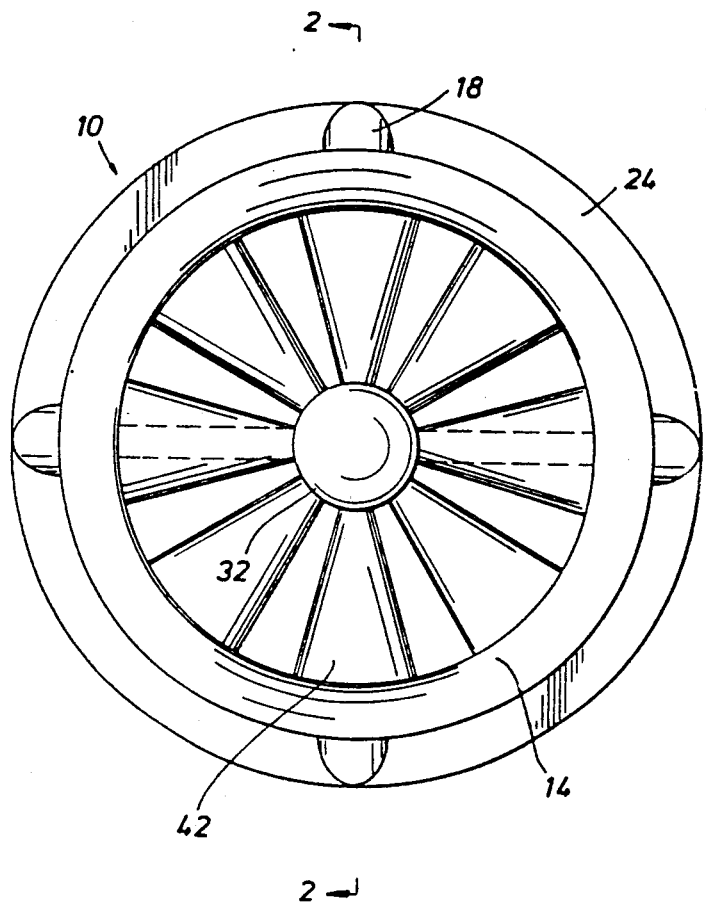
FIG.2
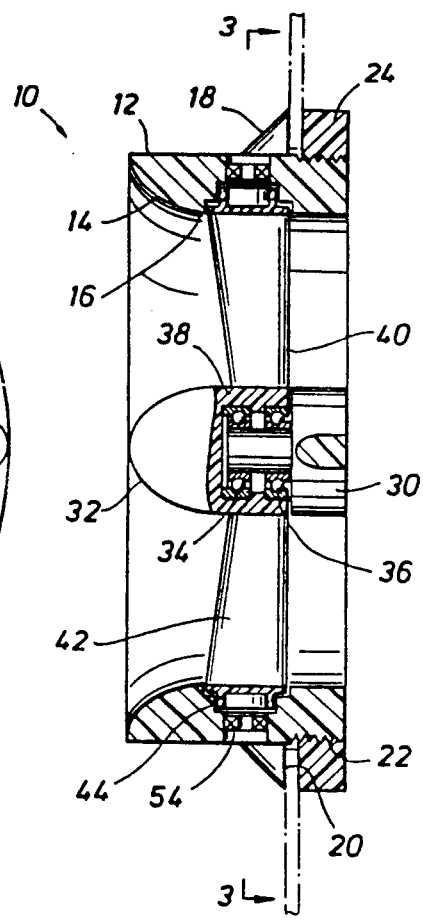
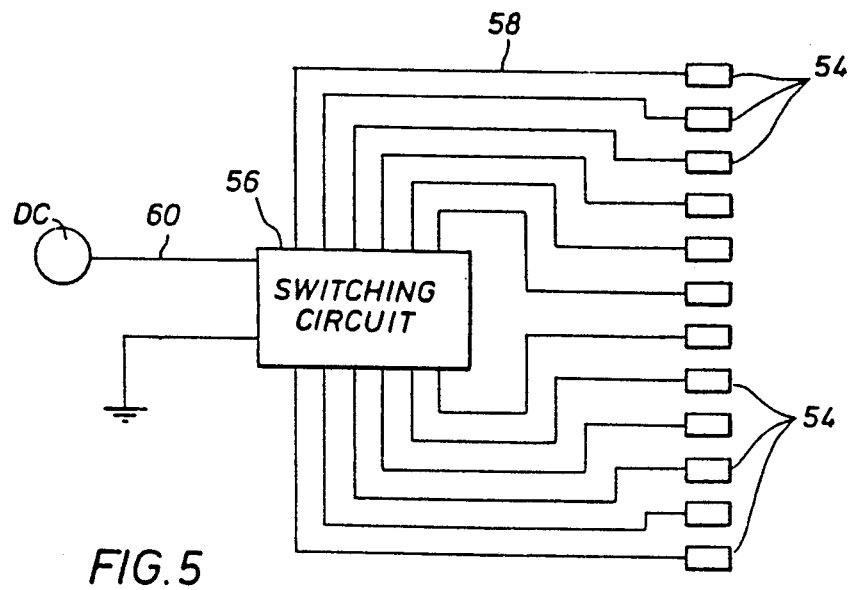
FIG.5

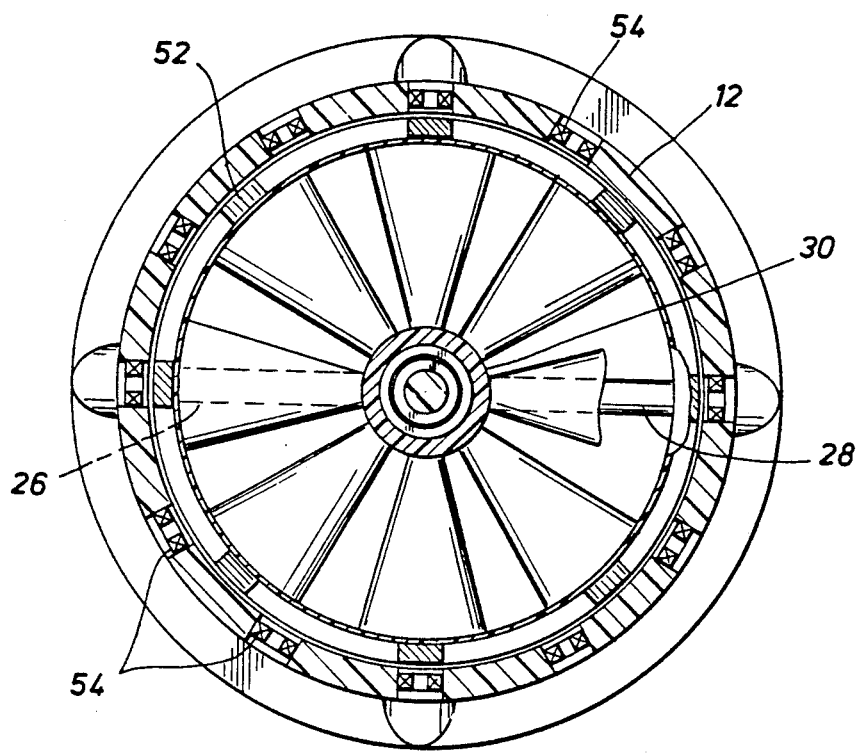
FIG. 3
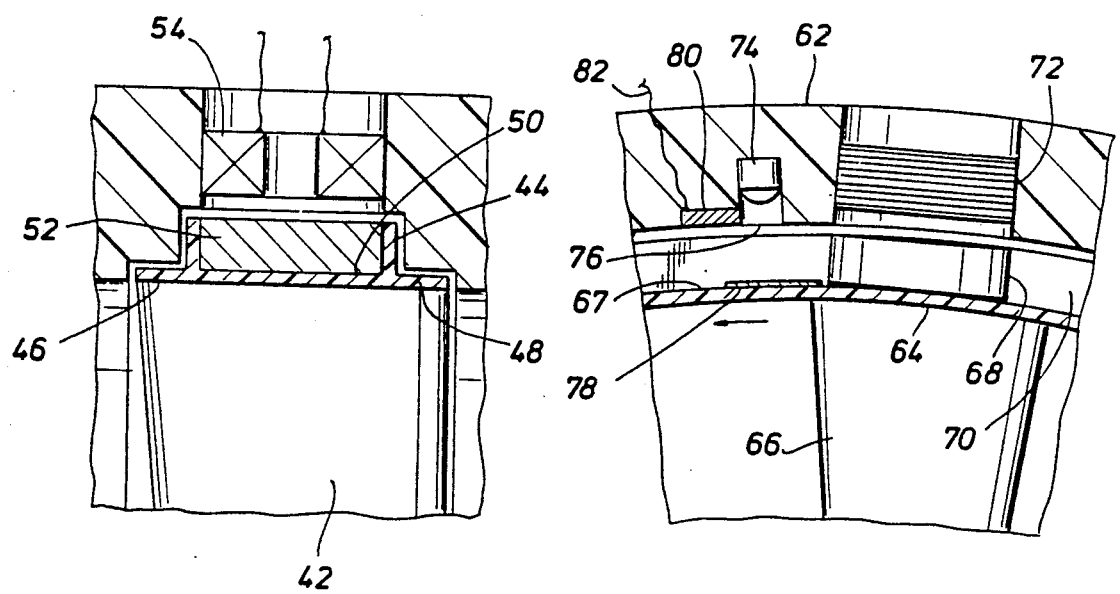
FIG. 4
FIG. 6

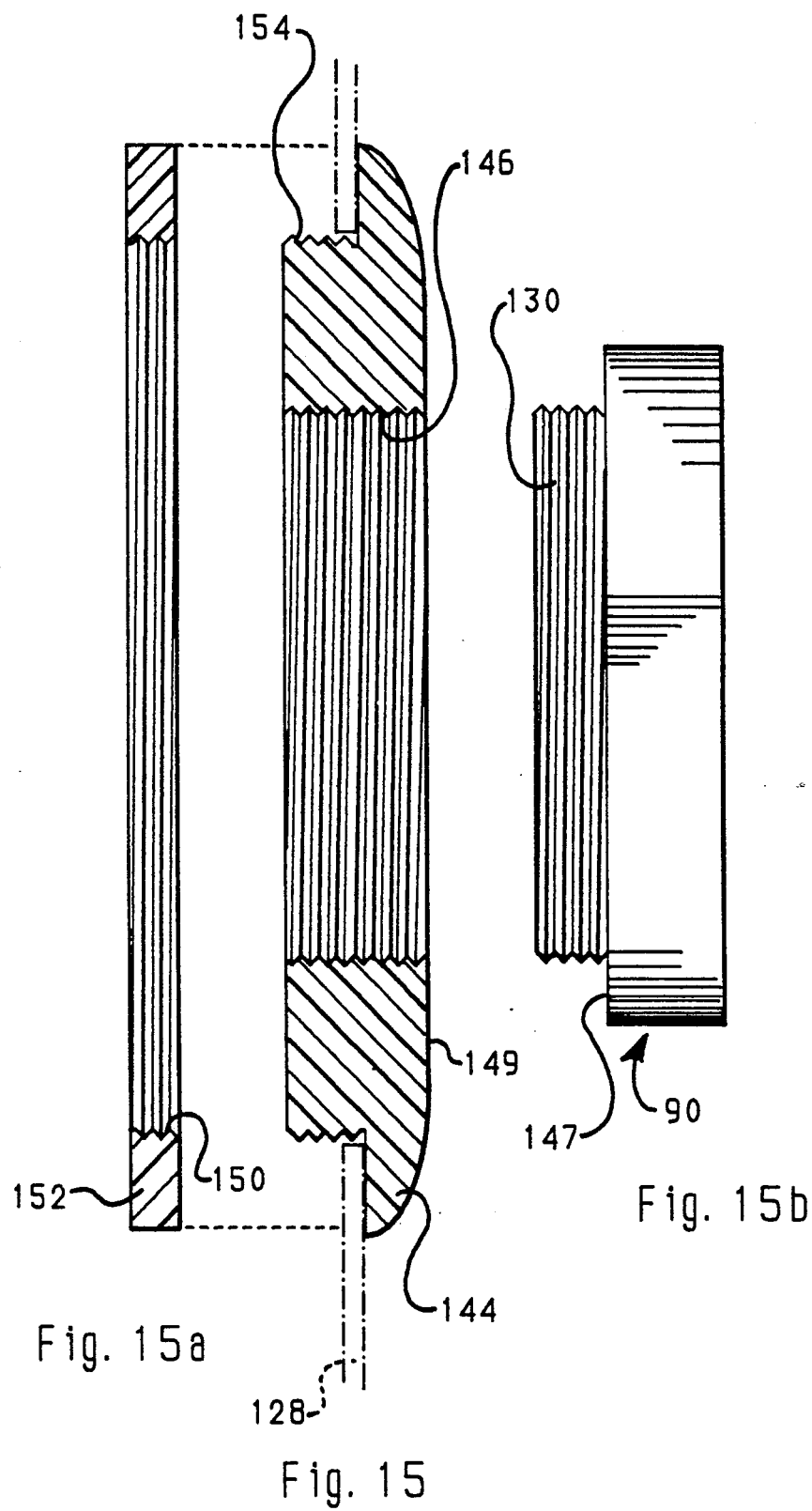

SOLID STATE DC FAN MOTOR

This is a Continuation-In-Part of application Ser. No. 07/303,320 filed Jan. 27, 1989 by Leonard H. Lipman for Solid State DC Fan Motor, now U.S. Pat. No. 4,949,022.

FIELD OF THE INVENTION

This invention relates generally to electric motors and more specifically brushless DC electric motors that are constructed in conjunction with a fan such as is typically employed to provide cooling for computers and other such electrical equipment. This invention also relates to mounting apparatus for fan motor assemblies.

BACKGROUND OF THE INVENTION

Virtually all down size computer equipment and small electronic equipment incorporate cooling fans that are continuously energized with the electrical equipment to remove heat that is developed in the electrical circuitry during operation of the equipment. Since the electrical equipment is typically of small size and of light weight, it is desirable that a cooling fan for the equipment also be of light weight.

While the present invention is discussed herein particularly as it relates to electrically energized computer fans, it is not intended to limit utilization of the invention exclusively to computers, it being obvious that the brushless DC fan motor of this invention may find effective use in conjunction with other electrical equipment and may be employed other than to drive a cooling fan. For purposes of simplicity, this invention is discussed herein particularly as it relates to small, light weight electrically energized fans for cooling down sized computers.

Earlier fan motors of similar construction and utilization employ a segmented solid ring of alternating polarity magnets which add weight and cost to the particular fan unit that is involved. These earlier fan motors also typically detect and employ the Hall effect current to commutate the coil or coils. The Hall effect is described as the change of the electrical conduction caused by that component of the magnetic field vector applied normal to the current density vector, which causes the angle between the current density vector and the electric field to change from the magnitude that existed prior to the induction of the magnetic field. The additional circuitry typically required for detection and employment of the Hall effect can add to the expense and detract from commercial feasibility of the particular motor that is involved. A simple solid state Hall effect circuit is therefore desired.

A parking magnet has also been utilized in at least one type of electrically energized fan motor to index the fan disc in order to initiate rotation and to control the direction of motor rotations at start up. Specifically, prior art patents disclosing these particular fan motor designs are depicted particularly by U.S. Pat. Nos. 4,459,087, 4,553,075 and 4,563,622. These fan motors each utilize a single electromagnetic coil which should produce uneven magnetic forces on the fan disc resulting in torque/flutter. This induces vibrations as the fan motor unit is operated, which vibration causes undesirable noise and obvious mechanical problems with the fan motor itself and with the electrical equipment with which the fan motor is employed. It is desirable, therefore to provide a novel, electrically energized direct current fan motor unit employing a plurality of coils and permanent magnets for operation thereof and which is designed to minimize or eliminate the introduction of torque/flutter and vibration that would otherwise be present. It is also desirable to provide a electrically energized fan motor system that does not require the presence of large, heavy, annular permanent magnets for operation of the motor.

In conventional electric motors a commutator and brush system is employed for sequentially activating the coils and thereby develop the electromotive force for motor operation. In addition to the weight established by large permanent magnets and large electrical coils, the presence of a commutator and brush system for coil activation also significantly adds to the weight and expense of the electric motor system. It is desirable, therefore, to provide a novel brushless electric motor which functions responsive to direct current to drive an air blower fan or other suitable equipment. It is desirable to provide a novel electric motor system wherein solid state switching is employed for the control of sequential coil activation to thereby provide the electromotive force necessary for motor operation.

Fans for computers and other electrical equipment are typically quite noisy due to the presence of torque/flutter, vibration, turbulence and acoustical noise. It is desirable to provide a novel electric fan motor system that is of quite simple nature and does not develop significant noise and vibration during operation thereof.

Many fan motors in use at the present time for cooling of computers and other electrical equipment incorporate central hub motors of significantly large size and thereby require the fan itself to be of large size to accommodate sufficient openings for movement of a desired volume of air for cooling. It is desirable therefor to minimize the physical size of the central hub portion of the fan system, thereby allowing the fan to be of relatively small dimension and yet define an air flow opening of sufficient dimension for efficient air flow at a desired rate for efficient cooling.

Most fans for electrical equipment such as computers are supported by metal plates such as those that form the chassis of the equipment. In most cases, the metal plate is formed with a large aperture within which the computer fan and its motor are positioned and a plurality of screws are utilized to secure flanges of the fan and motor system to the metal plate. Further, the metal plates of such equipment are designed with apertures to fit specific motor and fan assemblies so that it becomes difficult to interchange a different fan and motor assembly as compared to that with which the electrical apparatus is originally provided. It is desirable, therefore, to provide an efficient support for the motorized fans of electrical equipment and to provide an adapter assembly that permits efficient interchange of the fan motor systems of electrical equipment.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

FIG. 1 is a front elevational view of an electrically energized fan constructed in accordance with the present invention.

FIG. 2 is a sectional view of the electrically energized fan taken along line 2—2 of FIG. 1.

FIG. 3 is a sectional view taken along line 3—3 of FIG. 2.

FIG. 4 is a fragmentary sectional view of the upper portion of FIG. 2, illustrating the magnet support structure of the fan rotor in detail.

FIG. 5 is an electrical schematic diagram of a solid state switching circuit for sequential activation of the coils with which the motor mechanism is provided.

FIG. 6 is a fragmentary sectional view illustrating a portion of an electrically energized fan representing an alternate embodiment of this invention incorporating indexing by means of a light emitting diode circuit.

Figures 7, 7A:
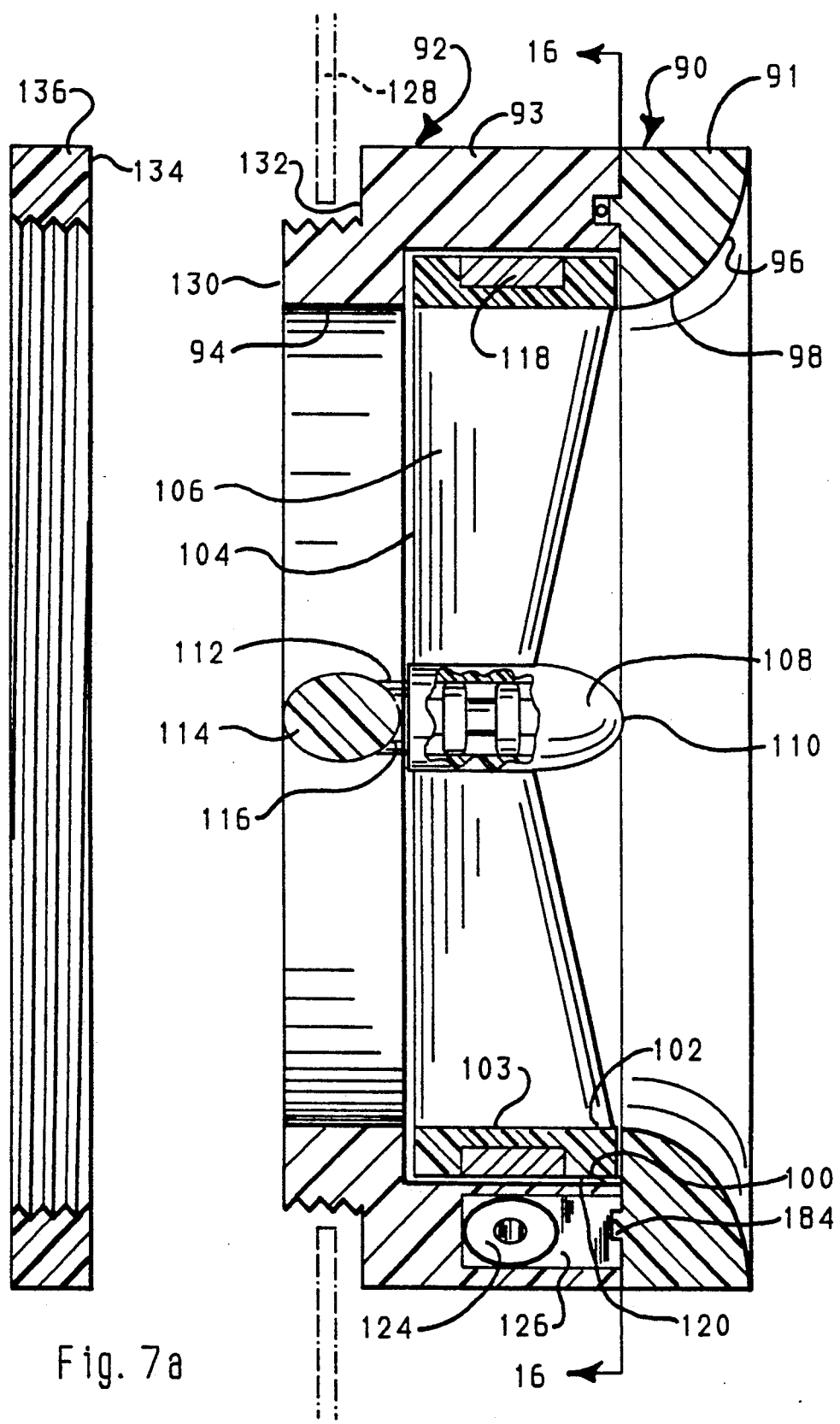

FIG. 7 is a sectional view of an alternative embodiment of the present invention which is retained in assembly with a support panel shown in broken lines by means of a locking ring and which incorporates coils of curved configuration matching the radius of the fan housing.

Figure 8:
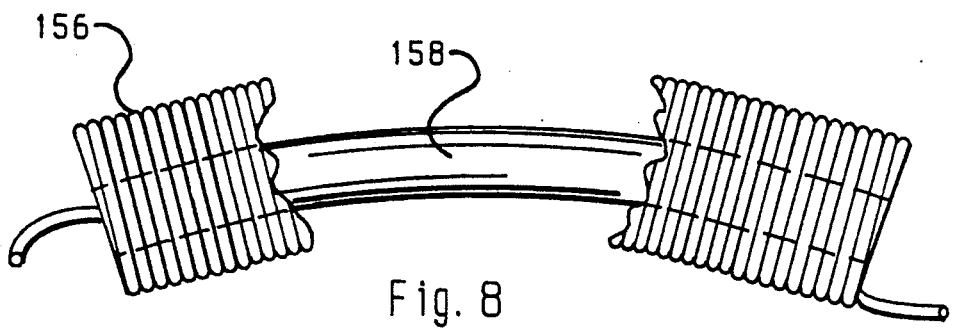

FIG. 8 is an elevational view of an elongate curved coil of the solid state fan construction of FIG. 7 with parts thereof broken away for illustration of the internal elongate curved core thereof.

Figure 9:
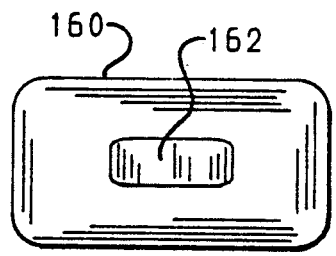

FIG. 9 is an end view of a generally rectangular elongate curved coil of generally rectangular cross-sectional configuration and which may be employed as the coil of the embodiment illustrated in FIG. 7.

Figure 10:
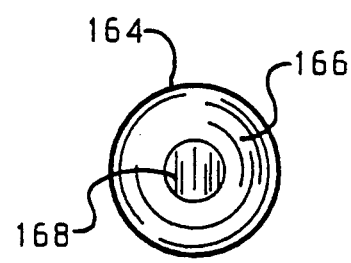

FIG. 10 is an end view of an elongate curved coil such as that shown at FIG. 8 and defining a substantially circular cross-sectional configuration.

Figure 11:
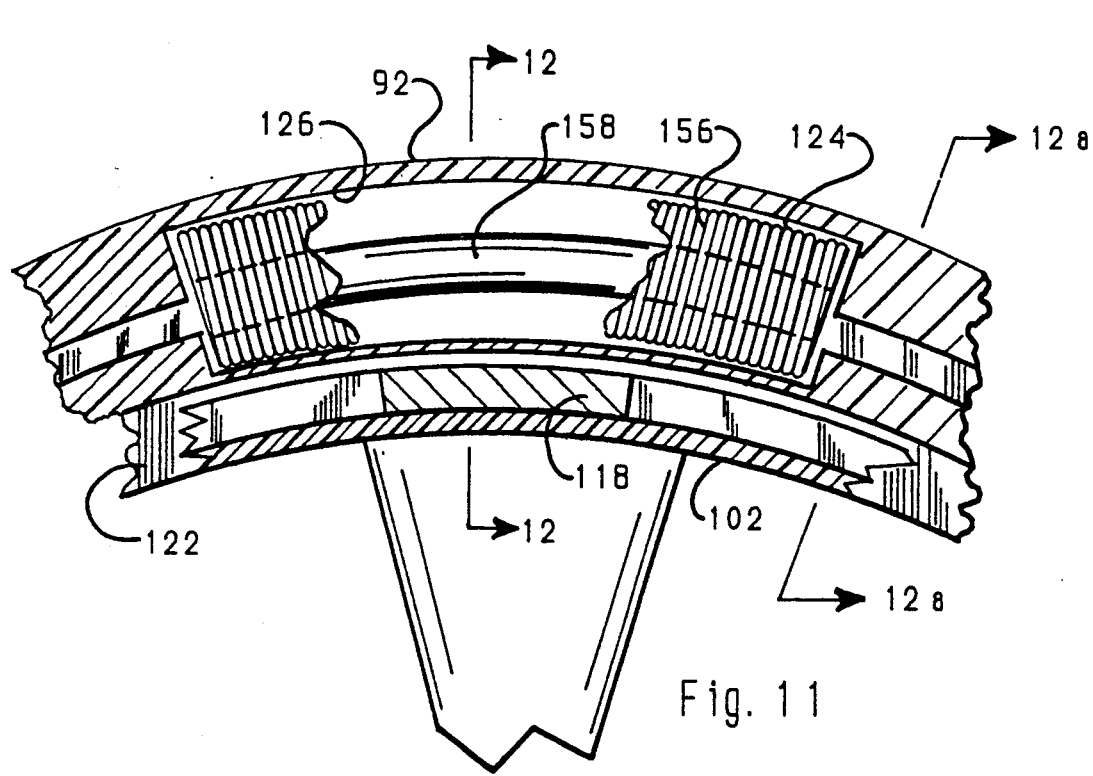

FIG. 11 is a fragmentary sectional view of the apparatus of FIG. 7 and showing the relative structural relationships of the housing, coil, magnet and fan blade.

Figure 12:
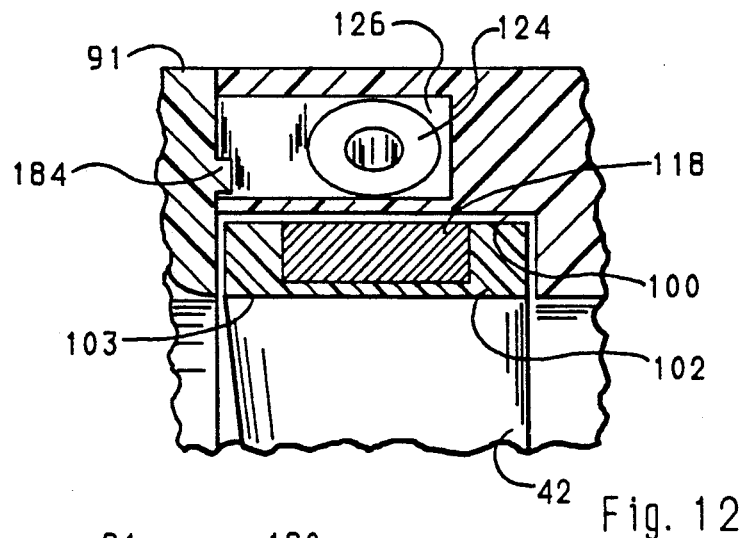

FIG. 12 is a fragmentary sectional view of the solid state fan construction of FIG. 11 taken along line 12—12.

Figure 12A:
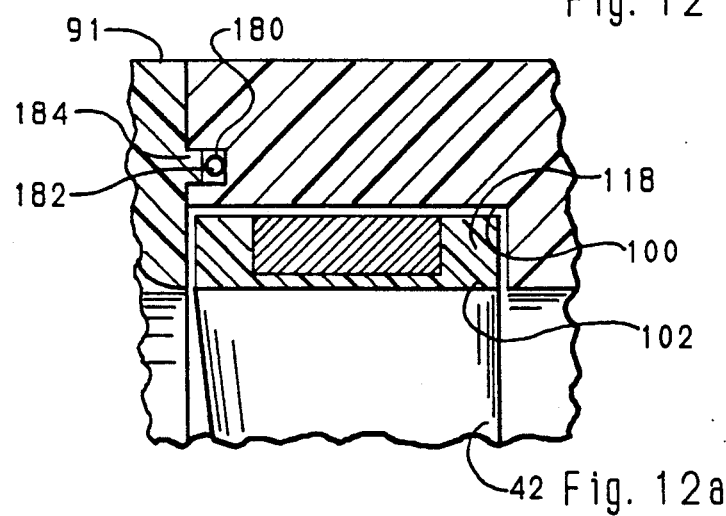

FIG. 12a is a sectional view taken along line 12a—12a of FIG. 11.

Figure 13:
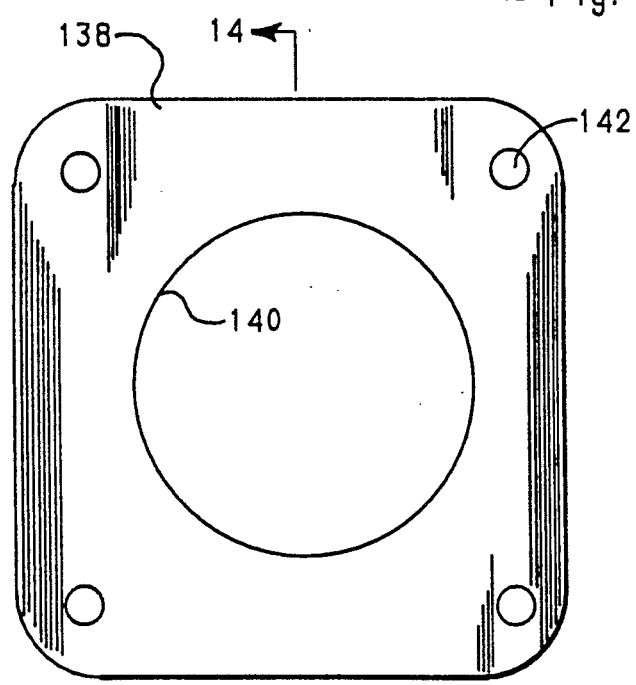

FIG. 13 is an elevational view of a combination fan locking ring for support of the solid state fan within electrical apparatus.

Figure 14:
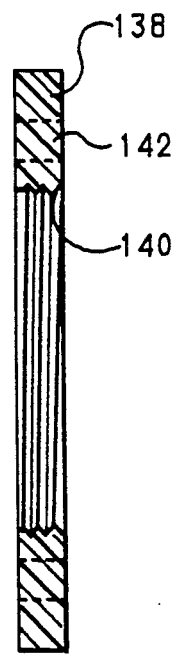

FIG. 14 is a sectional view taken along line 14—14 of FIG. 13 and illustrating screw holes by way of broken lines.

FIG. 15 is an exploded view illustrating a solid state fan being shown in separated relation with a fan adapter and with an adapter locking ring being shown separated from the adapter.

FIG. 16 is a sectional view taken along line 16—16 of FIG. 7 and which illustrates the coil and coil connecting wire receptacles of the housing structure.

FIG. 17 is an electrical schematic circuit in partial block diagram form which illustrates the electrical circuitry for operation of one embodiment of the invention.

FIG. 18 is an electrical schematic circuit in partial block diagram form which illustrates temperature controlled electrical circuitry for another embodiment of the invention.

DETAILED DESCRIPTION OF PREFERRED EMBODIMENT

Referring now to the drawings and first to FIGS. 1 and 2 an electrically energized fan is shown generally at 10 which incorporates an annular housing 12 defining a curved surface 14 which extends from the outer periphery of the housing to the inner periphery. The curved surface 14 functions as an air entry surface permitting smooth flow of air to the inlet opening of the fan. The inner periphery 16 of the housing 12 is of generally circular form and defines the opening or air flow passage of the housing.

The housing 12 defines radial stop means 18 which may be in the form of a circular radiating stop or a plurality of stop projections. The stop means 18 defines a planar stop surface 20 which is disposed for contact with a structural fan supporting member of the computer or other electrical equipment. The outer portion of the housing 12 defines an externally threaded section 22 which is adapted to receive an internally threaded retainer or mounting ring 24. After the fan housing has been placed within an opening defined by the structural member of the electrical equipment such that stop means 18 is in contact with the structural member, the mounting ring 24 is threaded into place to firmly lock the fan housing in assembly with the structural member. The structural member may simply be in the form of a support formed of sheet metal and having a circular opening therein of sufficient dimension for receiving the housing 12 of the fan unit.

As shown in FIGS. 2 and 3 the fan housing 12 is provided with a pair of transverse braces 26 and 28 which are formed integrally with or otherwise secured to the fan housing and which are positioned in radially opposed relation thus forming a single transverse strut that supports the fan rotor. The transverse braces are integral with or otherwise connected to a bearing housing 30. The bearing housing defines a smoothly curved surface 32 that also functions to minimize resistance of the bearing housing to air flowing through the flow passage of the housing. One or more bearings such as shown at 34 and 36 are employed to establish a low friction rotatable connection between the bearing housing and the central hub 38 of a fan rotor 40. The fan rotor incorporates a plurality of fan blades 42 which extend in radiating relation from the rotor hub 38. The fan blades 42 may in fact be formed integrally with the hub 38 such as by a molding operation if desired.

A circular channel member 44 is fitted about the rotor 40 in such manner that the tips of each of the rotor blades 42 are in contact with opposed cylindrical flanges 46 and 48 which define opposed axial extremities of the ring-like channel member. If desired, the circular channel may also be integral with the rotor and rotor blades. The fan may be molded from Nylon or ABS polymer material or any other suitable material. The channel member defines a pair of spaced circular, radial flanges which project away from the tips of the fan blades 42 and thereby define an annular receptacle 50 extending about the entire outer periphery of the rotor. A plurality of permanent magnets 52 are positioned within the circular receptacle 50 of the channel member and are secured therein such as by means of epoxy or by any other suitable means. The structure forming the channel member 44 may be formed as an integral part of the fan structure such as by a molding operation if desired. The permanent magnets 52 are disposed in appropriately spaced relation for coordinated registry with a plurality of electrical coils 54. As shown in the sectional view of FIG. 3, a plurality of small electrical coils are supported by the outer periphery of the housing 12 in equally spaced relation about the periphery of the housing and are positioned such that the permanent magnets 52 will come into close proximity with the respective coils during rotation of the rotor 40.

As mentioned above present brushless direct current electrical motors utilize the Hall effect for communication of the rotor. A sensor is typically provided to sense the Hall effect current and use it for rotor communication. For example, as taught in U.S. Pat. No. 4,563,622 a Hall switch can be employed to control a transistor whose collector-emitter circuit is in series with the stator coil of the motor. In this case exposure of the Hall effect device to a magnetic field of current polarity opens a conduction path from line to ground, thereby causing a resistor to supply base drive to the transistor. This biases the transistor into conduction and causes the coil to be energized. When reverse polarity or no polarity is sensed by the Hall effect device, the current path to the base of the transistor is closed, starving the base drive of the transistor and causing it to be non-conductive. The coil is thus deenergized until a magnetic field of the proper polarity is again sensed. The motor of this invention does not rely on a Hall effect sensor to control the commutation of the electrical coils. According to this invention a solid state circuit employing a solid state motor circuit including a solid state Hall effect sensor sequentially energizes the peripheral electrical coils in a rotational pattern which induces rotation in the disc. A parking magnet is not required to index the fan disc.

As shown schematically in FIG. 5, a solid state switching circuit is provided as shown at 56 which includes multiple coil energization circuits 58 that are electrically coupled to respective electrical coils 54 of the fan housing 12. The switching circuit 56 is energized by electrical power via conductor 60 from a suitable source S of direct current electrical energy. The coils 54 are sequentially energized under the control of the solid state switching circuit 56 to develop a properly polarized magnetic field that is attractive to and/or repulsive to the respective poles of the magnets 52. As the solid state switching system of the brushless direct current fan motor is energized sequential coil activation is developed responsive to the solid state switching circuit. This causes a sequence of electrical pulses to begin at a slow rate and steadily build to a predetermined rate that is suitable to the rotational speed (rpms) desired of the fan motor. The switching circuit also functions as a "governor" to control the maximum RPM of the fan at its operating speed. With this type of solid state switching the need for brushes, armature and commutator is eliminated. This in turn eliminates the need for parts that can wear and also eliminates the electrical noise that is ordinarily developed in electric motors by arcing between the brushes and commutator. This results in the provision of a very simple, quite efficient electrically energized fan.

The central hub 30 of the fan motor unit is quite small, only being of sufficient dimension to accommodate the bearings for support of the motor, and thus, even in a fan of small dimension, the flow passage through the fan can be significantly great as to provide a large volume of air flow. The rectangular mounting flange that is common to most fans of this general nature is eliminated by a threaded locking collar or retainer 24 that simply threads onto the housing to lock the housing securely to the structure of the electrical apparatus. Two micro ball bearings are utilized to support the central hub but bushings can be substituted to eliminate the somewhat noisy but reliable ball bearings. Because the central hub is quite small, it does not need numerous strut members. Only a single transverse strut is required for support of the central hub or bearing housing. This strut is streamlined to minimize turbulence and acoustical noise as air is caused to flow through the fan responsive to rotation of the fan blades. The streamlined fan profile that is presented by the fan unit provides an air flow output diameter that is not reduced by the bulk of a centrally located electric motor as is the case with conventional electric motors. Basically the result is a smaller, longer lasting, quieter and more efficient cooling fan which is desirable for small electronic equipment such as microcomputers and the like.

Referring now to FIG. 6 an alternative embodiment of the present invention is illustrated wherein indexing of the electric motor mechanism is accomplished by means of a light emitting diode (LED) circuit. FIG. 6 illustrates a housing structure 62 similar to that shown in FIG. 3. The housing 62 defines a circular internal opening 64 within which is rotatably mounted a fan structure also similar to that shown in FIG. 3. The fan structure incorporates a plurality of fan blades 66 with the fan forming an external channel 67 having disc magnets 68 provided at the radially outer portion thereof. The disc magnets traverse an internal circular channel 70 which is defined by the housing 62. The fan housing supports a plurality of electrical coils 72 in similar manner as discussed above in connection with FIG. 3 and shown specifically in FIG. 4.

According to the invention of FIG. 6, indexing of the motor mechanism is accomplished by means of an LED circuit incorporating an LED (light emitting diode) 74 which is supported by the housing 62 and which projects light through an aperture 76 of the housing onto a reflector 78 which is supported in the external channel 67 of the fan. Typically, the reflector 78 will be affixed to the bottom surface of the channel 67 though it may be supported in any other manner. A light sensor 80 which is also supported in fixed relation by the housing 62 is adapted to receive reflected light from the reflector 78 and to provide an electrical signal that is amplified and otherwise processed by the electronic circuitry to provide control for the fan mechanism to insure that the fan is always energized for rotation in a desired direction.

The lead 82 is connected with the light sensor 80 and is operative to transfer signals of the light sensor to the control circuitry of the motor.

In operation, light from the LED 74 passes through the housing and is directed from the aperture 76 to the reflector which is mounted on the spinning annular channel of the fan. The light reflected onto the light sensor generates an electrical current which triggers the energizing of the electromagnetic coils and ensures that the motor and fan rotate in the proper direction.

The motor mechanism set forth in FIG. 6 does not require a Hall effect circuit and does not include large annular permanent magnets for its operation. The motor mechanism therefore is of very light weight and may be efficiently incorporated within small electronic equipment such as down sized personal computers without adding significantly to the weight of the computer system. Moreover, the motor mechanism has an operational characteristic of low noise and virtually no vibration. It is therefore suitable for use as a fan motor in small electronic equipment.

Referring now to FIG. 7 a solid state electrical fan representing the preferred embodiment of this invention is illustrated generally at 90 which includes a housing assembly 92 which incorporates housing member 93 and a coil and conductor retainer 91 defines a generally cylindrical opening 94 that serves as the flow passage for air movement through the body structure. The retainer 91 defines a smoothly curved air inlet 96 which forms an internal dimension at 98 which substantially equals the dimension of the central opening 94.

The two piece housing assembly forms a circular internal fan recess 100 within which is received the outer peripheral rim portion 102 of a rotary fan member illustrated generally at 104. The fan defines a plurality of fan blades 106 which extend radially outwardly from a fan hub 108 having a smoothly rounded end 110 facing in the upstream direction. The fan blades 106 are formed integrally with or otherwise connected to the circular rim 102 to provide the fan blades with sufficient structural integrity. The central hub 108 of the fan rotor 104 is provided with bearing support about a shaft that projects from a bearing support 112 that is in turn supported by a transverse strut 114 having its respective ends formed integrally with or otherwise connected to the housing member 93. The transverse strut 114 is also provided with a smoothly curved surface 116 which faces upstream to the direction of air movement through the fan housing.

The peripheral rim 102 of the fan rotor defines an inner cylindrical surface 103 which is located in coincident relation with the circular edge 98 of the recess 100 and with the inner cylindrical surface 94 defining the flow passage through the fan motor housing. Positioning of the rim 102 within the recess 100 allows the generally cylindrical flow passage through the fan housing to be virtually unobstructed at its inner periphery, the obstruction to air flow being solely defined by the struts 114 and the central rotor element 108 with its bearing support 112. This feature permits the fan motor unit to be of quite small dimension and yet its air flow passage dimension is as great or greater than motorized fans of much larger dimension. This feature also minimizes air turbulence as the air progresses through the central opening under the influence of the fan rotor.

For the purpose of electrically driving the fan rotor 104, the outer rim 102 of the fan rotor is provided with receptacle means which retain a plurality of permanent magnets 118 in fixed relation therewith. The magnets 118 are in the form of plates or discs which are equally spaced about the outer periphery of the circular rim 102. The magnets 118 are each positioned so that the polarities thereof are identical. The outer portion of the magnets 118 project radially beyond the circular outer surface 120 of the rim 102 and are thus received within a circular recess 100 which is defined by the fan body 92 and includes radial walls 122. This feature places the magnets in close proximity with a plurality of coil members 124 which are received within respective coil receptacles 126 defined by the housing structure. The coils and their relationships to the permanent magnets will be discussed in detail hereinbelow.

The current method of attaching a fan to a bulkhead or chassis panel is accomplished with mechanical threaded devices such as nuts, bolts, and washers. Self-threading screws or rivets can also be employed. The disadvantage of conventional fan installation requires making five holes through the panel and assembly with threaded pieces which must be started, threaded, and tightened. This operation is somewhat time consuming and hardware must be inventoried and provided to the site of assembly.

To facilitate ease and simplicity of installation, the bulkhead 128 shown in FIG. 7 is provided with a single opening through which an externally threaded body projection 130 extends. The body section 93 also defines a circular abutment shoulder 132 against which the bulkhead is secured by means of a circular abutment surface 134 of an internally threaded retainer ring 136. The locking ring allows a true circular shape for the fan housing. Only one hole, the same size as the inside diameter of the locking ring, need be made in the bulkhead. The circular projection 130 of the fan housing is inserted into the hole in the bulkhead and the locking ring is threaded until the bulkhead is firmly captured between the inside faces 132 and 134 respectively of the body and both locking ring. Disassembly is simply a reverse order of the mounting steps.

As is evident from FIGS. 13 and 14, a locking ring may be provided in the form of a combination locking element that facilitates friction mounting of the fan housing in the manner discussed above in connection with FIG. 7 and which also permits the use of screws or by bolts to secure the fan mechanism to a bulkhead. The locking element 138 is provided with an internally threaded central opening 140 thus allowing the locking element to be threaded onto the projection 130 of the housing element 93 as discussed above. In order to provide for connection of the fan to a bulkhead by means of screws or bolt s, the locking element 138 is of generally rectangular form and is provided with a plurality of apertures 142 through which screws or bolts are extended to the bulkhead. Thus, for replacement of a fan motor mechanism such as shown at 90 in FIG. 7 through use of the locking element 138 the fan housing may be secured to the bulkhead by the frictional force of the locking ring or bolts or screws which extend through the locking ring.

As illustrated in FIG. 15, the solid state fan construction 90 of FIG. 7 may be secured to a bulkhead 128 by means of an adapter element 144 which defines an internally threaded opening 146 within which is received the externally threaded projection 130 is threadedly received. The adapter 144 defines a shoulder surface 148 which engages the bulkhead 128 and is secured to thereto by the force of a retainer surface 150 defined by retainer ring 152. The retainer ring is provided with an internally threaded opening 154 which is received by external threads 154 defined on the adapter ring. The two piece adapter element allows the insertion and securing of the fan to a computer or other device that once was cooled by a larger square fan which requires a central opening in the bulkhead which is a larger diameter than the outside diameter of the new fan. The fan would pass through this opening presenting a mounting problem. The adapter allows the fitting of the smaller round fan in this larger diameter opening. The inner threaded opening 146 is the same thread pitch and diameter as that on the rear of the fan housing, thus facilitating assembly of the fan body to the adapter element. To mount the unit, the adapter is placed into the bulkhead opening from the larger fan and the ring is tightened to compress the bulkhead between the flange and the ring faces. The fan itself is then threaded into the opening and tightened so that the shoulder 147 of the fan housing is firmly tightened against the surface 149 of the adapter. This is a very simple procedure that is simple to perform. Air flow is not obstructed, and the nuts, bolts and washers are eliminated.

For successful operation of this fan and all brushless DC motors, electromagnetic coils are required. The coils when connected to the switching circuits first build, then collapse a magnetic field. The flow of electrons through a wire creates a magnetic field. By forming this wire into a coil the magnetic field is increased. A further strengthening and concentration of this field can result from winding or wrapping wires about a ferrous core. Most of the cores examined consist of laminated iron or steel plates. These plates reduce or limit eddy currents that weaken or disturb the generated magnetic field. In some instances the wire is wound around a mandrel which is removed after the wraps have been captured with adhesives. The coils have no cores, yet a magnetic field can be produced at the price of efficiency.

According to the teachings of the present invention the motorized fan mechanism set forth herein employ coils such as shown at 156 in FIG. 8 having a ferrous core 158 that is of elongate curved configuration as shown in FIGS. 8 and 11 and which can take any one of a number of cross-sectional configurations as desired. For example, in FIG. 9 a coil is shown at 160 having an elongate ferrous metal core 162 of generally rectangular cross-sectional configuration. As shown in FIG. 10, the coil 164 is shown to have wires 166 wound about an elongate core 168 of generally circular cross-sectional configuration. The core material can be composed of soft iron, steel or other ferrous metals. The cores are monolithic, not layered, but their design is not limited solely to this configuration. An important factor in the formation of the cores is its distinct arch or curved profile as shown in FIGS. 8 and 11. The core is wound in alternating layers with the direction of wrapping substantially at right angles to the long axis of the core. The determined number of core windings are accomplished and then the coils are lithified with adhesives to prevent unwinding of the wire. The arch or curve of the coils is matched to the radius or curvature of the fan housing. With this shape the coils can be contained within the housing structure because the housing thickness is slightly greater than the thickness of the coil. A straight core, when located upon the perimeter of the circular housing, can not be contained within the housing without either increasing the thickness of the housing or decreasing the length of the coil. This would make the fan unit larger or would require additional coils with an increase in complexity and cost. The curved coils make possible the minimization of the housing size, and therefore, the fan unit as a whole. The curved coils also enhance the power of the electric motor since each coil is in close proximity to the magnets along the entire length of the coils thus inducing the concentration of the magnetic field in close proximity with the permanent magnets. The magnetic field which is generated concentrates at the ends of the coils in an ellipsoidal pattern. The least amount of magnetic field forms at the center of the coil. This is termed a "null point". The null point is identified as a point equidistant from the ends of the coil. This characteristic is important to note because this situation is instrumental in producing rotation. U.S. Pat. Nos. 4,563,622 and 4,553,075 teach that a straight coil lying parallel to rotation may be used in a fan motor. It should be noted that this coil can not be placed closely to the permanent magnet ring. In order to concentrate the generated magnetic field near the ring magnet, an electromagnet structure 42 is employed. In addition, this coil, if it were fitted into a circular housing, the housing would be required to be of greater thickness than if this coil were curved to fit the radius of the ring magnet. Another problem with this configuration is the decreased efficiency of motor performance, resulting from a weakening of the magnetic field by its transmittal along the electromagnetic structure.

According to the present invention the coils are placed directly opposite the permanent magnets, with only a small air gap separating these pieces. The benefits are a diminished frontal profile of the housing, and an optimization of the generated magnetic field that interacts with the field of the permanent magnet.

As shown by FIG. 16 the housing 93 forms a plurality of coil receptacles 170, 172 and 174 which are interconnected end to end by arcuate grooves or slots 176, 178 and 180. The coils 124 are positioned within the respective coil receptacles and are connected in series by conductors 182 which are located within the respective grooves or slots. The retainer element 91 shown in FIG. 7 forms a circular projection 184 which defines a closure for the grooves, thus encapsulating the conductors within the housing structure. The retainer also serves to encapsulate the coils within the housing structure as well.

With reference now to FIGS. 17 and 18, as in all DC brushless fans and motors of similar construction, a means of energizing the electromagnetic coils is required and is depicted generally by motor operation circuit 190. The motor operation circuitry includes a solid state integrated circuit 192, more specifically a micro-chip or driver chip. This driver chip by function is responsible for controlling the energizing of the coils 194, 196 and 198 with the proper amount of current. Should either high or low current levels be routed to the coils, rotation of the fan may cease, or a burn-out of the coils may take place. The driver chip 192 is sensitive to the current values. In most existing applications additional circuitry components such as voltage regulator 200 together with appropriate resistors and capacitors as shown, are required to limit the high current values. The coils themselves can also limit peak current levels in that they are by their construction and series connection, a resistor. A resistor by definition is an electrical device which resists or limits current flow. The coil circuitry of existing fan motors can have their coils wired or electrically connected in parallel. Simply stated, a parallel connection is supplying each coil a positive and a negative connection that is independent of every other coil. This necessitates the independent energizing of each coil. This type of circuitry can help reduce the peak current values that are available to the driver chip. The coil, by nature of its resistive nature, can reduce the amount of current sensed by the driver chip. The driver chip senses the individual resistive value of each coil due to the parallel circuitry. The driver chip can not read the cumulative values of all the coils. The coils would have to have additional windings to increase their resistivity. To allow the driver chip to function properly, the peak values can be decreased with either additional circuitry, or by adding windings to the coils therefore increasing the sensed resistive values. This procedure can result in a larger and more complex fan unit.

In accordance with the teachings of the present invention, the circuitry of the fan motor has its coils 194, 196 and 198 connected in series. Series is defined as connecting each coil to the next so as to complete a current flow path. To further describe this, the current flows from one coil to another until it finally goes to ground from the last coil. Since each coil is connected to the adjacent coil, the driver chip 192, when connected to this series circuit, energizes all of the coils simultaneously. This can be advantageous in limiting the peak current levels routed to or sensed by the driver chip. The driver chip is now able to sense the cumulative resistivity of all the coils, which is a value equal to the sum of the individual coils. This higher resistance level allows less windings on each coil and the elimination of additional current limiting circuitry. A smaller, more compact fan can result.

The rotation of the fan disc, which is basically comprised of the blades and hub, is accomplished by the generated magnetic field of the coils interacting with the magnetic field of the permanent magnets which are positioned at the outer periphery of the circular rim of the movable fan motor. The laws of magnetics teaches that like poles (NN or SS) repel each other while unlike poles (NS or SN) attract each other. The coils generate a magnetic field when energized by the electronic circuitry. Should this magnetic field be sufficiently strong to affect a permanent magnet, this magnet will be either pulled towards or pushed away from the coil depending on the polarity of the generated field. The polarity of the coil is determined by the direction of current flow through the wire windings. Consequently, the polarity of the coil poles can be reversed by reversing the direction of current flow through the coil. To effect rotation, the coils are energized at the correct positioning of the fan rotor. The motor of this invention employs push-pull system to produce the desired rotation. This procedure takes a sequence of steps to accomplish. The permanent magnet is located near one pole of the coil. The coil is energized so that a like polarity field exists. This condition forces the magnet away from the coil. Since the coil is firmly affixed to the housing, the magnet on the fan rotor moves in an arced path, thus showing the first step in rotation. The next step is the collapse of the generated magnetic field resulting from the current flow to the coil being stopped by the driver chip which is accomplished by the chip Hall sensor circuit 202. The momentum induced to the fan rotor carries the permanent magnet to a position close to the opposite end of the coil that is next in position in the housing. The coil is energized with the current flow direction such as required to produce a magnetic field that is unlike that of the permanent magnet. This field interaction pulls the magnet and its attached fan rotor towards the end of the coil. This, again, results in continued rotation of the fan rotor in a particular direction. The generated field once more collapses. The magnet and fan disc pass through the null point of the coil and is pushed away by the next flow of current to the coil. The magnets are also attracted to the ferrous core material of the coils. Although this attraction is fairly weak, it is sufficient to overcome the frictional forces of the hub bearings. Thus, the fan rotor will stop its rotation at a point that places the permanent magnet at a point that is equidistant from the ends of the coil. This indexes the fan rotor so that it is in proper relationship to the coils to effect rotational start-up. This fan motor, as previously stated, has its coils connected in series, which means all coils are energized together. Further, the polarity of the generated fields is the same in all the coils because the same current flow direction is routed to all coils. As stated in this text, the rotation of the fan disc requires the presence of permanent magnets near the electromagnets. Other fan motors examined in prior art typically shown an alternating of the polarity of the permanent magnets as they are disposed on the fan rotor. A typical arrangement of the poles would be N,S,N,S. This fan motor alters this sequence by keeping the same polarity of the magnets situated on the circular rim member 102. This pattern of polarity is as follows: N,N,N,N . . . or, S,S,S,S . . .. The reason that this arrangement is capable of maintaining rotation reverts back to the fact that the coils are in series and have the same polarity at the same time. The coil-to-permanent-magnet configuration is such that a magnet is located in juxtaposition to a coil. Further stated, if a coil is situated each 120° of arc in the housing, an accompanying magnet is located at each 120° of arc on the structural member. This configuration simplifies construction of the fan unit. This feature permits elimination of the usual alternating polarity ring magnet, which is heavy and bulky. This large magnet piece, when rotating, generates a great deal of momentum and it is critical that the rotor be in perfect dynamic balance. In addition, the various structural members must be of heavier construction in order to accommodate the forces produced by the spinning magnet ring. A slight imbalance can result in significant undesirable vibration. The less massive magnets embodied in the fan of the present invention are less prone to vibration due to the significant decrease in mass. Since the balancing procedure is much simpler, production costs can be lower. Supporting members such as the strut 114 and housing 92 can be lighter and smaller, thus permitting the manufacture of a fan motor mechanism which is of light-weight construction, which makes it more acceptable for use in light-weight electronic equipment.

SPEED CONTROL

It is desirable to incorporate a means of changing or varying the speed of the fan. The generation of noise is a major consideration.

All fan motors, and most electrical equipment, are a source of two types of noise. The acoustic noise is audible in the human hearing range and results from vibration, air turbulence, and power pulses induced to the rotating fan disc. Over a period of time this noise can be irritating to the equipment operator. The second type is Radio Frequency Interferences (RFI), which results from electron flow through the various electronic components. This noise is similar to the output waves of a radio transmitter. These waves can be detrimental to the electronic circuitry found in computers and other equipment. These noises can be reduced by both electronic and mechanical means, however, decreasing the speed or revolutions of the motor and fan disc drastically lowers both acoustic and RFI noise levels.

It is, therefore, advantageous to operate the fan at a low speed. Conversely this lower speed decreases the amount of the air flow, thereby, reducing the ability of the fan to remove damaging heat. This unit seeks to solve this problem by offering a variable speed control system that is temperature dependent. A solid state temperature sensor is incorporated into the motor driver circuitry. During the majority of the operation cycle the fan is running at a low speed, producing lower noise levels and consuming less power to do so. As the ambient temperature of the air in the computer housing increases, the sensor detects this rise and at a preset temperature causes the circuitry to increase the revolutions of the fan motor. This speed increase allows the fan blades to move more air thus cooling the equipment. The subsequent decrease in the ambient air temperature causes the sensor to signal the circuitry with a decrease in the motor speed. This cool, heat, cool cycle continues as the air temperature is heated by the computer and cooled by the fan. It should be noted that the construction of the fan allows the sensor and the electronic circuitry to be remote to the fan motor. This allows the temperature sensor to be placed at the source of the heat generation such as the power supply unit or the main printed circuit board. Should the sensor be part of the fan sensitivity to temperature changes is decreased. In certain cases the sensor and motor driver circuitry could be incorporated into the electronics of the computer or equipment itself. The variance in speed can take the form of a high speed and low speed circuit, but it can also include a vast range of speeds rather than the two described above.

The circuitry of FIG. 18 differs from that of FIG. 17 in the provision of a temperature sensing and control circuit 204 having one or more temperature sensing elements 206, 208 and 210 which may be located on or near heat sensitive elements of the fan motor construction, such as a coil, a resistor, a bearing etc. The temperature signal which is transmitted by appropriate conductors to the solid state temperature sensor chip 204 is output to an amplifier circuit 212, the amplified and processed signal being input to the driver chip 192 causing the driver chip to change its speed controlling current output to the motor coils 194, 196 and 198. The motor speed adjustment can be incremental through selection of preselected motor speed current outputs or it may be linear with the current output to the coils being established in direct relation with the temperature conditions being sensed.

It is therefore seen that this invention is one well adapted to obtain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by, and is within the scope of the present invention.

As many possible embodiments may be made of this invention without departing from the spirit or scope thereof, it is to be understood that all matters hereinabove set forth and shown in the accompanying drawings are to be interpreted as illustrative and not in a limiting sense.

What is claimed is:

1. A direct current electric fan motor for use on small electrical equipment, comprising:
   (a) a fan housing forming a circular fan rotor opening and having a bearing support located centrally of said fan rotor opening and bearing means positioned by said bearing support, said fan housing forming a circular internal recess;
   (b) a plurality of electrical coils being supported by said housing in spaced relation about the periphery of said circular fan rotor opening;
   (c) a fan having a central rotor being rotatably supported by said bearing means and having a plurality of fan blades radiating from said central rotor;
   (d) a plurality of permanent magnets being provided at the outer portions of at least some of said fan blades and being positioned for close proximity with said electrical coils during rotation of said fan, said plurality of permanent magnets of said fan being positioned to traverse said circular internal recess during rotation of said fan; and
   (e) a solid state electrical circuit for sequentially energizing said coils and commutating said permanent magnets of said fan.

2. The direct current electric fan motor of claim 1, wherein:
said fan housing defines a circular surface of curved cross-sectional configuration forming an air entry opening for said fan housing.

3. The direct current electrical fan motor of claim 1, wherein:
said fan defines a circular structural rim member forming an internal dimension being of substantially the same internal dimension as that of said circular fan rotor opening, whereby air flow through said circular fan rotor opening is substantially unrestricted and turbulence of air flow is minimized.

4. The direct current electrical fan motor of claim 1, wherein:
   (a) said fan housing defines a plurality of equally spaced coil receptacles each receiving one of said plurality of electrical coils and forms groove means interconnecting said coil receptacles;
   (b) electrical conductors being positioned within said groove means and interconnected to said electrical coils in series; and
   (c) means substantially closing said coil receptacles and said groove means and encapsulating said electrical coils and said electrical conductors within said fan housing.

5. The direct current electrical fan motor of claim 4, wherein:
said closing means is a circular retainer element being receivable in interlocked assembly with said fan housing and cooperating therewith to define a fan housing assembly.

6. The direct current electrical fan motor of claim 5, wherein:
said retainer element defines a circular locator projection thereon, said circular locator projection being received within each of said groove means for encapsulation of said conductors within said fan housing.

7. The direct current electrical fan motor of claim 1, wherein:
each of said plurality of electrical coils is of elongate arcuate configuration conforming to the curvature of said circular fan rotor opening and including an elongate arcuate core about which coil wire is wrapped and stabilized.

8. The direct current electrical fan motor of claim 7, wherein:
each of said electrical coils and said elongate arcuate cores are of generally circular cross-sectional configuration.

9. The direct current electrical fan motor of claim 7, wherein:
each of said electrical coils and said elongate arcuate cores are of generally rectangular cross-sectional configuration.

10. The direct current electrical fan motor of claim 1, wherein:
  (a) said fan housing forms abutment shoulder means and forms a threaded projection to be received within a mounting opening of fan motor support structure; and
  (b) a threaded locking element being receivable in threaded engagement with said threaded projection and forming a shoulder disposed in compressive engagement with said fan motor support structure to secure said fan motor in substantially immovable relation with said fan motor support structure.

11. The direct current electrical fan motor of claim 10, wherein:
said locking element defines a plurality of apertures therein for selectively permitting mounting of said fan motor to said fan motor support structure by means of threaded fasteners.

12. The direct current electrical fan motor of claim 1, wherein:
  (a) said solid state electrical circuit incorporates a Hall effect sensor;
  (b) said plurality of electrical coils are interconnected in series; and
  (c) said plurality of permanent magnets are each positioned with the same polarity thereof being exposed to said electrical coils.

13. The direct current electrical fan motor of claim 12, including:
a temperature sensor circuit capable of sensing temperature at at least one selected location and inducing said solid state electrical circuit to adjust the speed of motor operation in response to the temperature conditions being sensed.

14. The direct current electrical fan motor of claim 13, wherein said solid state electrical circuit includes:
a solid state driver circuit for controlling current output to said plurality of said electrical coils, said solid state driver circuit receiving temperature signal input from said temperature sensor circuit and inducing linear current output to said plurality of electrical coils from said solid state drive circuit in directly proportional relation to the temperature being sensed, thus providing said fan motor with a temperature responsive variable speed control.

* * * * *